(12) United States Patent
Nakajima et al.

(10) Patent No.: US 7,634,131 B2
(45) Date of Patent: Dec. 15, 2009

(54) IMAGE RECOGNITION APPARATUS AND IMAGE RECOGNITION METHOD, AND TEACHING APPARATUS AND TEACHING METHOD OF THE IMAGE RECOGNITION APPARATUS

(75) Inventors: Akira Nakajima, Otsu (JP); Yasuhisa Watanabe, Nara (JP)

(73) Assignee: OMRON Corporation, Kyoto (JP)

( * ) Notice: Subject to any disclaimer, the term of this patent is extended or adjusted under 35 U.S.C. 154(b) by 568 days.

(21) Appl. No.: 10/861,896

(22) Filed: Jun. 4, 2004

(65) Prior Publication Data

US 2005/0002562 A1 Jan. 6, 2005

(30) Foreign Application Priority Data

Jun. 6, 2003 (JP) .............................. 2003-161992

(51) Int. Cl.
*G06K 9/62* (2006.01)
(52) U.S. Cl. ..................... 382/155; 382/149; 382/181
(58) Field of Classification Search ............ 257/E21.53, 257/E21.125, E21.527; 356/FOR. 100, 100; 369/53.15, 53.17; 434/159, 167; 381/FOR. 112, 381/112; 382/149, 150, 155, 181, 229, 159, 382/170, 165; 700/110, 104; 701/28, 59; 706/12, 20, 25, 39, 42, 45, 58, 61, 50, FOR. 118, 706/131; 707/6; 725/19; 702/35, FOR. 125
See application file for complete search history.

(56) References Cited

U.S. PATENT DOCUMENTS 7,319,971 B2* 1/2008 Abrahams et al. .............. 705/7
2002/0159643 A1* 10/2002 DeYong et al. ............. 382/228
2003/0164942 A1* 9/2003 Take ........................ 356/237.2

FOREIGN PATENT DOCUMENTS

JP 1993-332754 12/1993
JP 07-104827 A 4/1995

(Continued)

OTHER PUBLICATIONS

Notification fo Reasons for Rejection for Japanese Application No. 2003-161992 mailed on Jun. 30, 2009 and English translation thereof, 12 pages.

(Continued)

*Primary Examiner*—Matthew C Bella
*Assistant Examiner*—Gregory F Cunningham
(74) *Attorney, Agent, or Firm*—Osha • Liang LLP

(57) ABSTRACT

To provide an art capable of easily generating accurate teaching data from a small number of teacher images.

The image of a standard object is captured to extract a characteristic value from the teacher image of the standard object through image processing while making a user input the already-known knowledge for a configuration of an object and an object such as a tolerance and entering the knowledge in a knowledge base. Then, context data in which various attributes which can be objects are described together with their semantics is generated in accordance with the characteristic value extracted from the teacher image of the standard object and the knowledge entered in the knowledge base. Moreover, attributes corresponding to types of characteristic values used for recognition processing are extracted from the context data entered in the knowledge base to generate the teaching data for the recognition processing.

34 Claims, 9 Drawing Sheets

FOREIGN PATENT DOCUMENTS

| | | |
|---|---|---|
| JP | 1996-021803 | 1/1996 |
| JP | 11-258177 A | 9/1999 |
| JP | 11-272801 A | 10/1999 |
| JP | 2001-168160 | 6/2001 |

OTHER PUBLICATIONS

Notification fo Reasons for Rejection for Japanese Application No. 2003-161992 mailed on Apr. 7, 2009 and English translation thereof, 8 pages.

* cited by examiner

Fig. 5

| Name | Format | Configuration | Conformation | | | | | | Brightness | Number of pins | Tolerance | |
|---|---|---|---|---|---|---|---|---|---|---|---|---|
| | | | Surface transparency | Shape | Length | Area | Color (R,G,B) | | | | | |
| IC chip 1 | QFP | IC package lead pin | 9 | Square | 3 cm | 9 cm² | 50,50,50 | | 10 | 52 | ±0.05mm | ... |
| IC chip 2 | QFP | IC package lead pin | 9 | Square | 3 cm | 9 cm² | 50,50,50 | | 10 | 108 | ±0.04mm | ... |
| .. | .. | .. | .. | .. | .. | .. | .. | | .. | .. | .. | .. |
| IC chip n | QFP | IC package lead pin | 9 | Square | 3 cm | 9 cm² | 50,50,50 | | 10 | 206 | ±0.03mm | ... |

| Name | Format | Configuration | Conformation | | | | | Brightness | Individual-difference value region | Environmental-difference value region | |
|---|---|---|---|---|---|---|---|---|---|---|---|
| | | | Surface transparency | Shape | Length | Area | Color (R,G,B) | | | | |
| Detect 1 | Straight line | Scratch | 0 | Straight line | 5mm | 1 cm² | 0,0,0 | 5 | α | β | ... |
| Detect 2 | Straight line | Chip | 0 | Straight line | 3mm | 1 cm² | 0,0,0 | 10 | α | β | ... |
| .. | .. | .. | .. | .. | .. | .. | .. | .. | .. | .. | ... |
| .. | .. | .. | .. | .. | .. | .. | .. | .. | .. | .. | ... |
| Detect n | Absent | Loss | Absent | Absent | 0 | 0 | 0 | 0 | α | β | ... |

IMAGE RECOGNITION APPARATUS AND IMAGE RECOGNITION METHOD, AND TEACHING APPARATUS AND TEACHING METHOD OF THE IMAGE RECOGNITION APPARATUS

BACKGROUND OF THE INVENTION

1. Field of the Invention

The present invention relates to an image recognition apparatus for recognizing an object from an image and a teaching apparatus of the image recognition apparatus.

2. Description of the Prior Art

An art has been known so far which recognizes an object by applying image processing to an image photographed by a camera and extracting a characteristic value. This image recognition art is applied to various image recognition apparatuses including an inspection apparatus for an industrial product and a visual-sense apparatus of a robot.

To specify an object through image recognition, it is necessary to previously teach a computer about the characteristic of the object. This operation is referred to as teaching. Teaching is described below by using an inspection apparatus as an example. First, a non-defective product and a defective product are prepared. Then, characteristic values for the non-defective product and characteristic values (scratch and chip) for defective portions of the defective product are extracted from images (teacher image) obtained by imaging them to decide a determination reference value (teaching data) for determining the quality of an object to be inspected in accordance with these characteristic values.

Japanese Patent Laid-Open No. (Hei) 8-21803, now Japanese Patent No. 3,140,177 and Japanese Patent Laid-Open No. 2001-168160 are known as the prior art for the above field. Japanese Patent Laid-Open No. (Hei) 8-21803 proposes an apparatus for determining the type of a defect detected through a defect inspection by making a neuro processing unit learn various defect information. U.S. Pat. No. 3,140,177 proposes an apparatus capable of correcting an inspection reference value of an object included in the middle between a non-defective product and a defective product. Japanese Patent Laid-Open No. 2001-168160 proposes an apparatus for determining the type of a defect of an object in accordance with a defect detection parameter and defect characteristic value data.

An object to be recognized generally includes a fluctuation due to an individual difference and a fluctuation frequently occurs in an image due to the fluctuation of an imaging environment such as illumination or environmental light. In the case of a defective product, there are infinite types of defects and there is no pattern to a position where a defect appears or the shape or size of the defect. Therefore, to perform teaching, it is necessary to prepare the maximum number of teacher images of non-defective and defective products (e.g. several tens to several hundreds).

FIG. 9 shows an illustration conceptually showing conventional image teaching. In FIG. 9, a point plotted by a circle denotes a characteristic value of a non-defective product and a point plotted by a cross denotes a characteristic value of a defective product. By collecting many characteristic values of non-defective and defective products, the difference between trends of fluctuation of non-defective products and the difference between trends of fluctuation of defective products are confirmed to set a determination reference value between them (continuous line in FIG. 9).

However, because it is impossible to exhaustively prepare teacher images, it is difficult to confirm a correct boundary between a range of fluctuation of non-defective products and a range of fluctuation of defective products only by teaching using an image. Therefore, as shown in FIG. 9, a determination reference value (continuous line) hardly coincides with a correct boundary (broken line). In this case, a product to be originally determined as a non-defective product (white triangle in FIG. 9) is determined as a defective product or a product (black triangle in FIG. 9) to be originally determined as a defective product is determined as a non-defective product and thereby, an inspection error occurs.

Therefore, it has been necessary to drive in teaching data by repeating teaching many times or manually adjusting teaching data so that a non-defective product and a defective product are correctly determined (that is, so as to be intended by a user). However, the above operation must be performed by a skilled person having advanced skill and know-how by using lots of labor and time. Therefore, improvement is requested.

SUMMARY OF THE INVENTION

The present invention is made to solve the above problems and its object is to provide an art capable of easily generating accurate teaching data from a small number of teacher images.

Moreover, it is another object of the present invention to provide an art capable of improving the success rate and accuracy of recognition processing.

To achieve the above objects, a teaching apparatus of the present invention performs teaching as described below.

In the case of the present invention, the image of a standard object having a standard conformation is captured among objects to be recognized to extract a characteristic value from the teacher image of the standard object through image processing. Moreover, a user is made to input the already-known knowledge of a range of fluctuation of objects and other objects to enter the knowledge in a knowledge base. It is allowed to previously execute either of these processings or execute them in parallel.

By combining the information on the conformation of the standard object extracted from the teacher image with the information on the fluctuation of objects obtained as knowledge, it is possible to confirm a range of fluctuation of objects centering around the standard object, that is, a range to be recognized as objects.

In this case, it is preferable to make a user input a range of fluctuation due to the individual difference between objects and a range of fluctuation due to the environmental error at the time of imaging as the knowledge of fluctuation of objects. Thereby, it is possible to obtain the information on the specific fluctuation of objects and the information on the fluctuation caused by the influence of illumination or environmental light.

In the case of an industrial product, it is recommended to make a user input a tolerance for design as the knowledge of a range of fluctuation due to the individual difference between objects. It is possible to easily know the tolerance for design from the design information of CAD data and the tolerance for design. Originally, this is because the tolerance is the information showing an allowable range of objects.

Moreover, it is preferable to make a user input not only a range of fluctuation of objects but also an attribute for a standard object. For example, it is possible to more accurately define a standard object which is the aspect of an object to be originally present by providing attributes such as accurate dimension and shape from design information.

The present invention generates context data in which various attributes which can be objects are described together with their semantics in accordance with a characteristic value extracted from the teacher image of a standard object and the knowledge entered in a knowledge base and enters the context data in the knowledge base.

The characteristic value extracted from the teacher image is the specified information showing only a standard object which is a specific object. However, the context data generated in accordance with the characteristic value and the knowledge in the knowledge base is an aggregate of the generalized information showing the whole object to be recognized (that is, a range of objects to be recognized). Moreover, because various attributes are controlled together with their semantics, the versatility and appropriateness of information are improved and it is easy to use the context data for various purposes or problem solution.

In the case of the context data, it is preferable that various attributes are described by a structurization language. Thereby, it is possible to systematically control not only a numeral and value region which can be quantitatively defined but also various attributes such as a character string, function, and correlation between components in a computer readable format.

A typical purpose of context data is generation of teaching data. The present invention extracts an attribute corresponding to the type of a characteristic value used for recognition processing from the context data entered in a knowledge base and generates the teaching data for the recognition processing. Thereby, it is possible to easily generate accurate teaching data from the teacher image of only a standard object.

The teaching data thus generated is stored in a teaching data storage device and used for recognition processing by an image recognition apparatus.

An image recognition apparatus of the present invention captures the image of a work, extracts a characteristic value from the image of the work through image processing, executes recognition processing in accordance with the teaching data read from the teaching data storage device and the extracted characteristic value, and recognizes the work by determining whether the work is an object. By using the accurate teaching data generated at the above teaching stage, it is possible to accurately perform recognition processing at an image recognition stage. The work denotes an object to be recognized at the image recognition stage.

Moreover, it is possible to use the above context data at the image recognition stage.

For example, when failing in recognition at the image recognition stage, it is possible to generate the context data for defining various attributes of a work from an extracted work characteristic value, apply image processing to the image of the work, in accordance with the difference between attributes of the generated work context data and the context data for an object entered in a knowledge base, and perform recognition processing by using an image-processed work image.

Because the standard state of various attributes of an object is defined for context data, it is possible to find a problem of a work image, that is, a cause failing in recognition processing by examining a difference from the standard state. Therefore, by applying image processing for removing the problem to the work image, and using the image-processed image and thereby performing recognition processing, it is possible to improve the success rate and accuracy of the recognition processing.

Moreover, when a correct determination result is not obtained at the image recognition stage, it is also possible to generate the work context data for defining various attributes of the extracted work from the characteristic value of the work, select an attribute capable of correctly determining the work in accordance with the difference between attributes of the generated context data and the context data for an object entered in a knowledge base, search a recognition logic capable of executing recognition processing by using a characteristic value corresponding to the selected attribute, and generate the teaching data for the searched recognition logic.

Thereby, teaching data according to an optimum recognition logic is automatically generated. Therefore, manual teaching-data homestretch is unnecessary, the time and labor necessary for teaching are reduced, and the success rate and accuracy of recognition processing are improved.

In this case, when a recognition logic capable of executing recognition processing by using a characteristic value corresponding to a selected attribute is not searched, it is recommended to communicate the content to a user. In this case, it is more preferable to communicate the specification of a recognition logic to be added in accordance with the selected attribute to the user. Thereby, the user can find a recognition logic to be newly added.

Moreover, the present invention can be seized as an image recognition apparatus having a device for performing at least a part of the above processing or a teaching apparatus of the image recognition apparatus. Furthermore, the present invention can be seized as an image recognition method for performing at least a part of the above processing, a teaching method of the image recognition apparatus, an image recognition program for realizing the method, or a teaching program of the image recognition apparatus.

BRIEF DESCRIPTION OF THE DRAWINGS

FIG. 5 shows an illustration showing an example of context data entered in a knowledge base.

DESCRIPTION OF THE PREFERRED EMBODIMENTS

Preferred embodiments of the present invention are illustratively described below in detail by referring to the accompanying drawings. In this case, examples to which the present invention is applied to an inspection apparatus for inspecting industrial products are described.

First Embodiment

Figure 1:
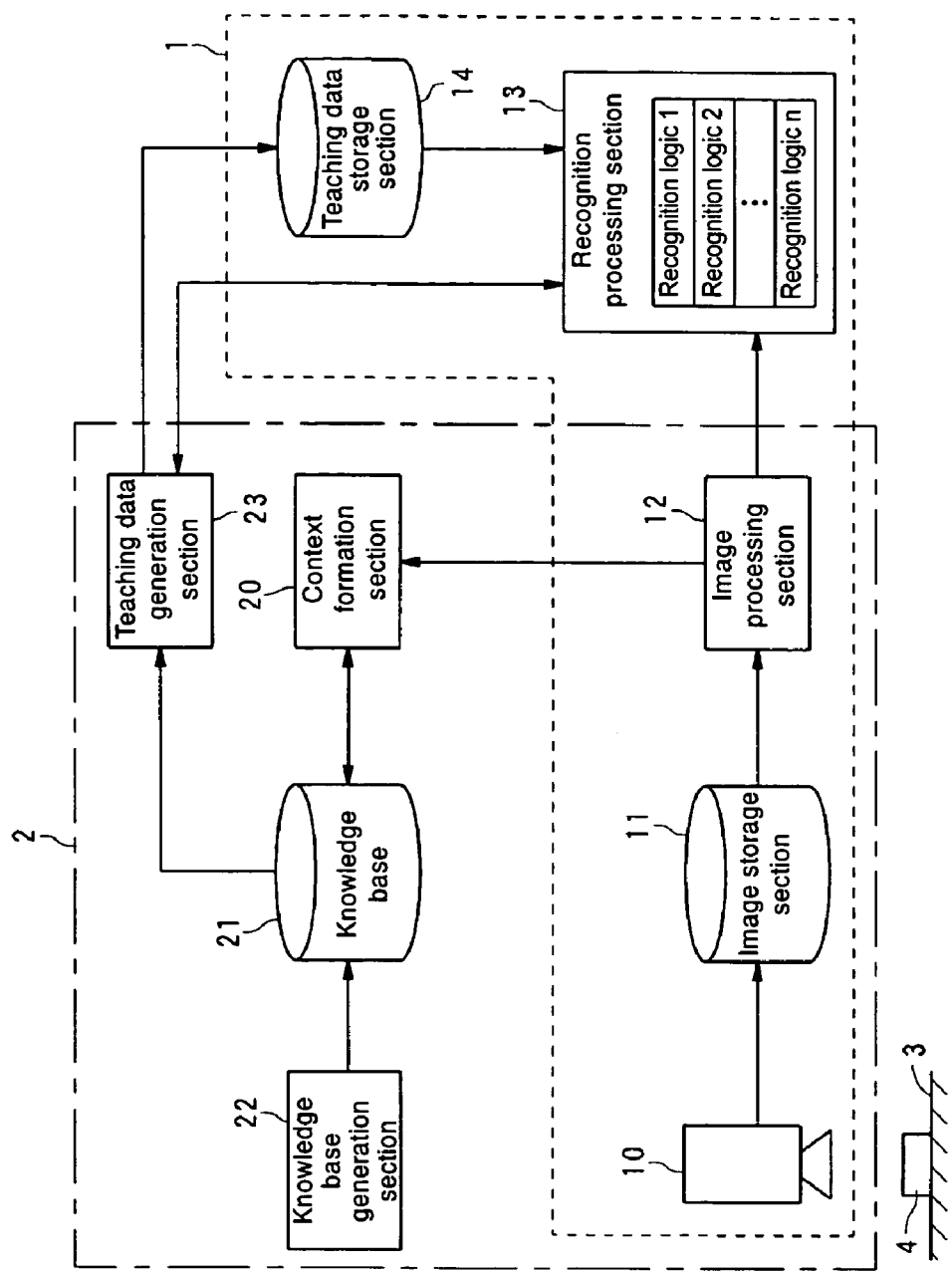
FIG. 1 shows a block diagram sowing a functional configuration of an image recognition apparatus of a first embodiment of the present invention.

FIG. 1 shows a block diagram showing a functional configuration of an image recognition apparatus of the first embodiment of the present invention. As shown in FIG. 1, the image recognition apparatus is almost constituted by an image recognition section 1 for performing image recognition processing and a teaching section 2 for performing teaching processing.

The image recognition apparatus can be constituted by a general purpose computer system having a CPU (Central Processing Unit), memory (main memory), hard disk (auxiliary memory), display (display section), keyboard (input section), MO device (external memory), and camera (imaging section). Functions of the image recognition section 1 and teaching section 2 are realized when a program stored in the hard disk is read in the memory and executed by the CPU and thereby software and hardware are collaborated each other.

The image recognition section 1 is constituted by including an imaging section 10, image storage section 11, image processing section 12, recognition processing section 13, and teaching data storage section 14.

An imaging section 10 is an imaging device for capturing an image. The imaging section 10 can use a CCD camera. The imaging section 10 images an inspection object 4 put on a table 3 and captures the image of the object into the image recognition apparatus. The image captured by the imaging section 10 is temporarily stored in the image storage section 11 constituted by a frame memory and the like. It is allowed that the image is a color image, light-and-shade image (black-and-white image), or special image such as an infrared image. The type of the image is properly selected in accordance with the purpose of the image recognition apparatus.

The image processing section 12 is an image processing device for extracting a characteristic value from an image through image processing. The image processing section 12 applies image processing to an image read from the image storage section 11 to extract various characteristic values such as the transparency, texture, color, brightness, length, and area of the inspection object 4. The characteristic values extracted in this case are delivered to the recognition processing section 13.

The recognition processing section 13 is a recognition processing device for performing recognition processing in accordance with teaching data and a characteristic value extracted by the image processing section 12 to determine whether the inspection object 4 in an image is an object to be recognized. The recognition processing section 13 has several tens to several hundreds of recognition logics and separately uses one or a plurality of recognition logics in accordance with an object to be recognized. The object to be recognized may be a non-defective product or a defective product including a defect (scratch, chip, imperfect assembly, or imperfect soldering).

Contents of recognition processing (combination of recognition logics used, recognition logic execution procedure, and threshold and value region to be seen by recognition logics) are defined by teaching data. A plurality of teaching data values are prepared every recognition processing to be executed by the recognition processing section 13 and the recognition processing section 13 reads proper teaching data from the hard disk or teaching data storage section 14 set to an MO device to use it. These teaching data values are generated by the teaching section 2.

The teaching processing by the teaching section 2 of this embodiment uses approach completely different from conventional approach. The difference between them is described below.

Figure 9:
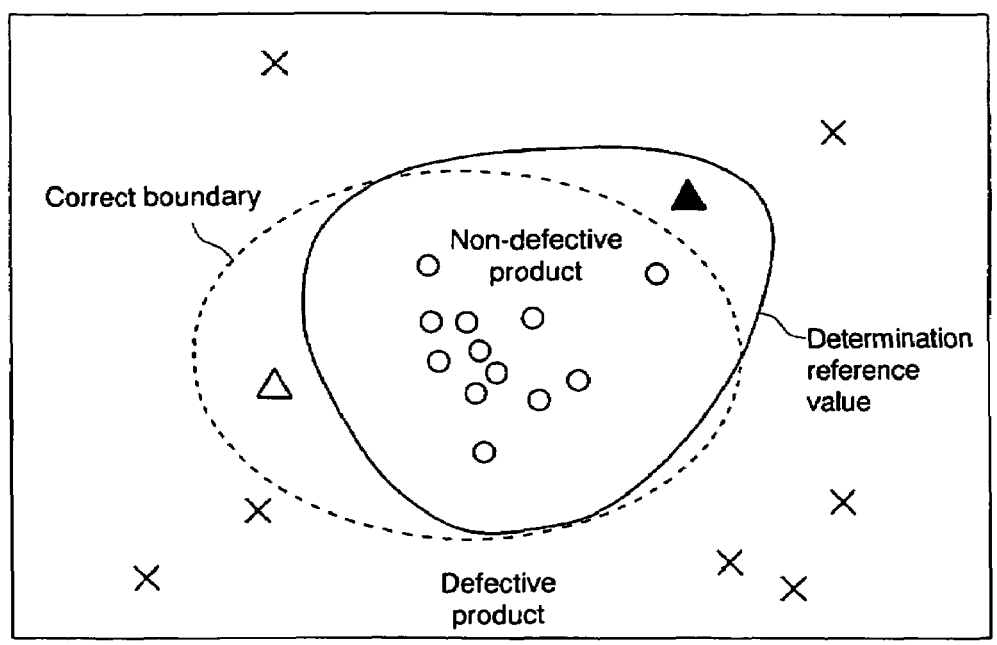
FIG. 9 shows an illustration conceptually showing conventional image teaching.

In the case of conventional image teaching, as described above, a maximum number of teacher images of objects to be recognized (such as non-defective product) and teacher images of non-objects (such as defective products) other than the non-defective products are prepared to decide a range of fluctuation of non-defective products and a range of fluctuation of defective products in accordance with the trend of characteristic values obtained from these teacher images (refer to FIG. 9).

However, the teaching of this embodiment has the following features.

Firstly, the approach is used which accurately defines an object having a standard conformation (hereafter referred to as "standard object") among objects to be recognized and defines a range of fluctuation of objects centering around the standard object (that is, a "range to be recognized as object").

Figure 2:
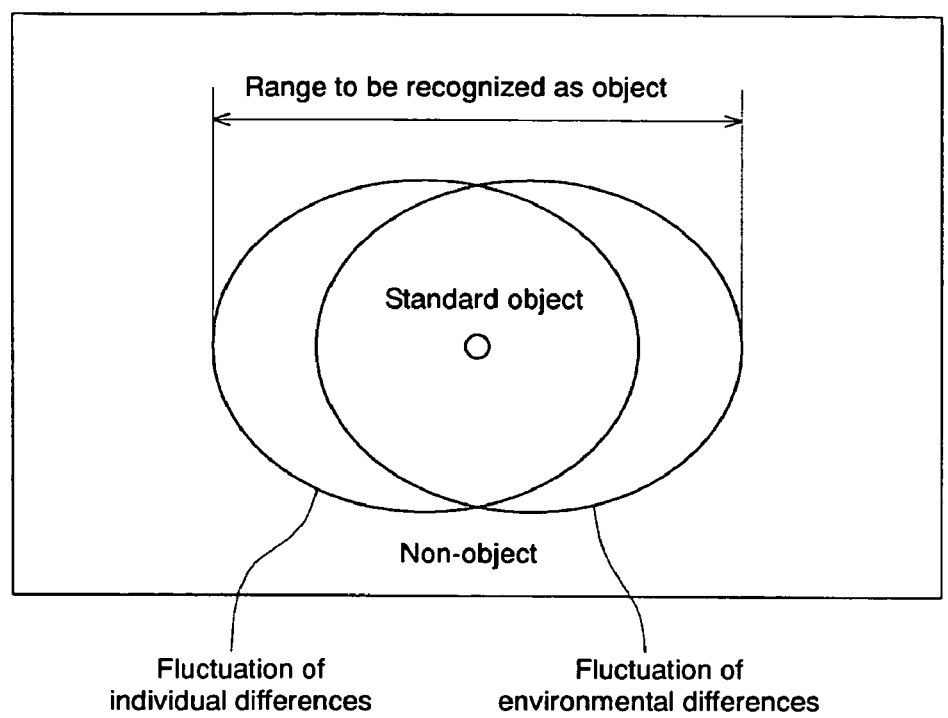
FIG. 2 shows an illustration conceptually showing teaching in an embodiment of the present invention.

FIG. 2 conceptually shows the above approach. In FIG. 2, a point plotted by a circle shows a "standard object" and a range shown by the sum-set of fluctuation of individual differences and fluctuation of environmental differences shows a "range to be recognized as object".

Secondly, to realize the approach, not only characteristic values obtained from teacher images but also the knowledge already known for objects by a user are used.

It is possible to easily obtain the information on the conformation of the standard object from the teacher image of the standard object. Moreover, it is possible to obtain the information which cannot be known unless it is actually formed into an image (such as the information on color or brightness which is differently seen depending on an imaging environment or the information on the position, size, or range of an image). However, it is impossible to know a range to be recognized only by the information. Moreover, information to be obtained is limited on a standard object.

Therefore, in the case of this embodiment, by obtaining a characteristic value for a conformation from the teacher image of a standard object while obtaining various attributes such as an accurate dimension, type, configuration, and name from the knowledge of design information and the like, a standard object which is the aspect of an object to be originally present is more accurately defined. Moreover, the information which cannot be obtained from a teacher image such as fluctuation of individual differences or fluctuation of environmental differences is provided as knowledge. For example, the dimensional tolerance of design information is provided as an individual difference value region or the influence of an illumination intensity of illumination on an image is digitized and provided as an environmental difference value region.

Thirdly, to systematically control various attributes of objects in the computer readable format, a data format of context data is used. The context data is data describing various attributes which can be objects together with their semantics, which is described by a structurization language such as XML (extensible Markup Language). Attributes to be described in the context data can include not only a numerical value and a value region which can be quantitatively defined but also the information on a character string, function, and correlation between components. By describing various informations in the context data, it is possible to comprehensively define an object from various sides.

The characteristic value extracted from the teacher image is specified information showing only a standard object which is a specified object while the context data generated from the characteristic value and knowledge is an aggregate of generalized informations showing the whole object to be recognized (that is, range to be recognized as objects).

Therefore, by examining whether the characteristic value obtained from the image of a work is included in the range defined by the context data, it is possible to determine whether the work is an object. However, because it is not necessary to use all attributes included in the context data for actual recognition processing, it is only necessary to generate determination reference values such as a threshold and value region by extracting only attributes necessary for the context data when generating teaching data.

This embodiment makes it possible to easily generate accurate teaching data from a small number of teacher images by performing teaching in accordance with the above approach.

Then, a specific configuration for realizing the above teaching processing is described below.

As shown in FIG. 1, the teaching section 2 is constituted by including the imaging section 10, image storage section 11, image processing section 12, context formation section 20, knowledge base 21, knowledge base generation section 22, and teaching data generation section 23. In the case of this embodiment, the image recognition section 1 and teaching section 2 are integrally constituted to share components of the imaging section 10, image storage section 11, and image processing section 12. However, it is also possible to constitute the teaching section 2 separately from the image recognition section 1 to use it as an external teaching apparatus.

The knowledge base 21 is a database for systematically storing various attributes of objects in the form of context data. The knowledge base generation section 22 has a function for providing an interface for entering context data in the knowledge base 21, and reading, editing, and deleting the context data entered in the knowledge base 21 for a user.

The context formation section 20 is a context data generation device for receiving a characteristic value extracted by the image processing section 12 and generating context data in accordance with the characteristic value and the knowledge entered in the knowledge base 21. The context data generated by the context formation section 20 is entered in the knowledge base 21.

The teaching data generation section 23 is a teaching data generation device for generating teaching data from context data. The teaching data generated by the teaching data generation section 23 is stored in the teaching data storage section 14.

Figure 3:
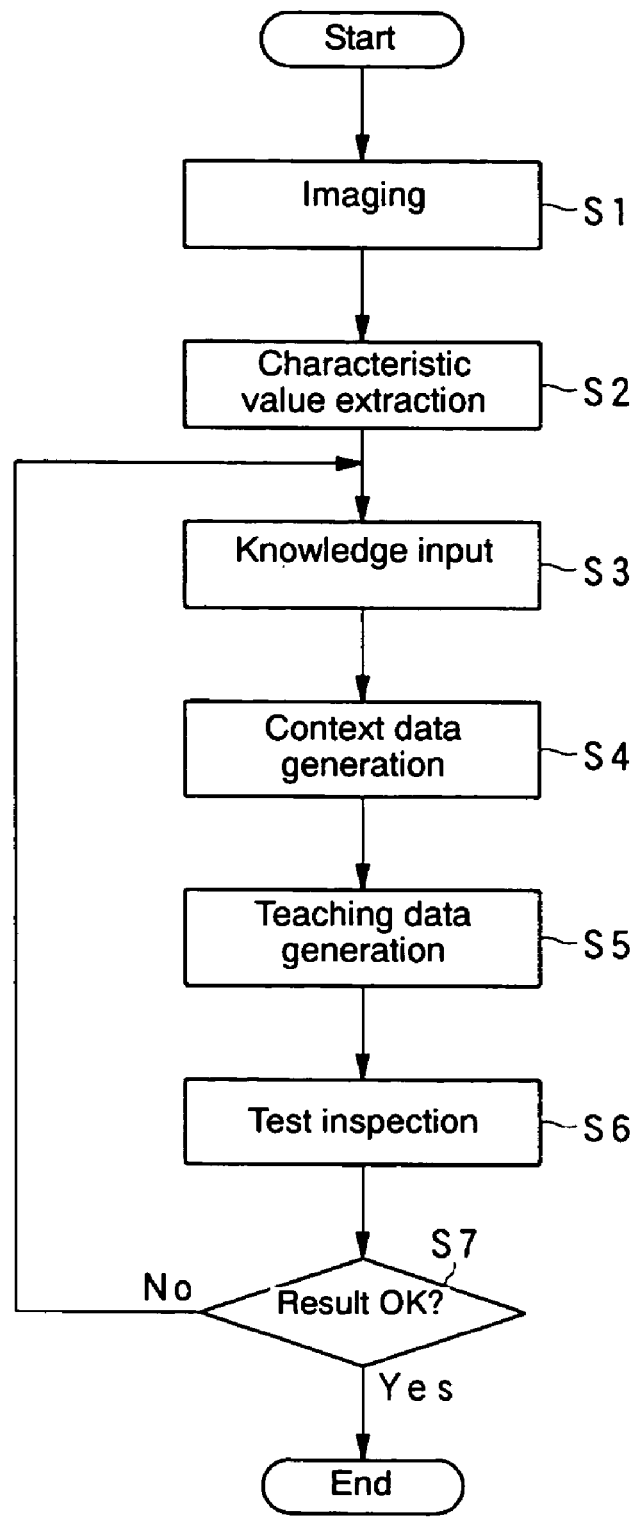
FIG. 3 shows a flowchart showing a flow of teaching processing.
Figure 4:
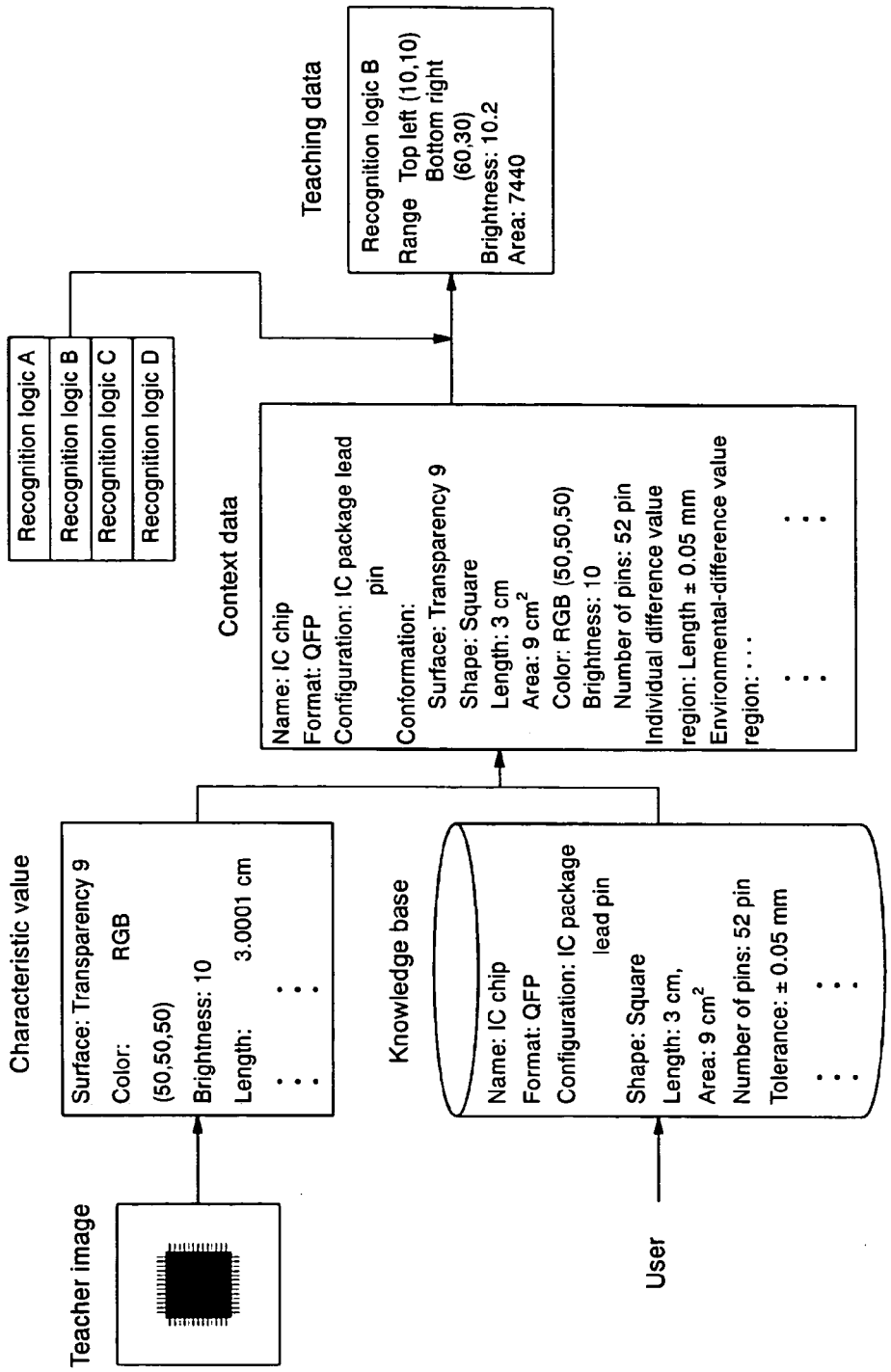
FIG. 4 shows an illustration for explaining a data flow of teaching processing.

Then, a specific flow of teaching processing is described below by referring to FIGS. 3 to 5. FIG. 3 shows a flowchart showing a flow of teaching processing, FIG. 4 shows an illustration for explaining a data flow in teaching processing, and FIG. 5 shows an illustration showing an example of the context data entered in a knowledge base.

In this case, teaching for a non-defective product inspection of IC chips is described as an example. That is, "non-defective IC chips" become objects to be recognized and all objects other than non-defective IC chips become non-objects.

Firstly, a user selects a sample of a standard object. It is possible to select a master piece as the standard object. Or it is allowed to select two or three non-defective samples accurately manufactured. Then, a selected sample is imaged by the imaging section 10 to capture a teacher image (step S1).

The image processing section 12 applies image processing to the captured teacher image of the standard object to extract characteristic values such as the transparency, colors, brightness, longitudinal and transverse lengths, and area of the surface of an IC chip (step S2). Moreover, it is allowed to extract the characteristic value of the background portion around the IC chip. In the case of the example of FIG. 4, characteristic values such as a transparency "9", colors "RGB (50, 50, 50)", brightness "10", length "3.0001 cm", and area "9.0006 $cm^2$" are extracted. When selecting a plurality of samples as standard objects, it is allowed to use the average value of characteristic values obtained from teacher images as the characteristic value of the standard objects.

The knowledge base generation section 22 makes a user input knowledge (step S3). The user can input already-known knowledge for the name, format, configuration, function, individual-difference value region, and environmental-difference value region of an object and other objects by operating an knowledge input interface provided by the knowledge base generation section 22. In the case of the example in FIG. 4, the following knowledges are input: name "IC chip", format "QFP", configuration "IC package and lead pin", shape "square", length "3 cm", area "9 $cm^2$", number of pins "52 pins", and tolerance "length ±0.05 mm". These knowledges are entered in the knowledge base 21 by the knowledge base generation section 22. It is allowed to execute the processing in step S3 before or in parallel with the processing in step S1 or S2.

Then, the context formation section 20 generates the context data for defining a non-defective IC chip by combining a characteristic value extracted from a teacher image with the knowledge entered in the knowledge base 21 (step S4). In this case, attributes are classified and stratified in accordance with their semantics, attributes are related with the semantics, and described in context data. Thereby, semantic structures of various attributes are clarified and the various attributes become data which can be easily handled by a user and a computer, the versatility and appropriateness of information are improved and it is easy to use the context data for various purposes or problem solution.

When the data belonging to the same attribute are included in both a characteristic value and knowledge, the context formation section 20 preferentially uses the data provided as knowledge. This is because the data provided as knowledge has a higher reliability. In the case of the example in FIG. 4, though the data for "length" and "area" of an IC chip are included in both a characteristic value and knowledge, the context data uses "3 cm" and "9 $cm^2$" provided as knowledge.

The context data thus generated is entered in the knowledge base 21 by the context formation section 20. As shown in FIG. 5, it is possible to enter context data for many objects in the knowledge base 21. Moreover, it is possible to enter various context data values not only for non-defective products but also for defects independently of the type of a product.

The context formation section 20 can use accumulated context data as knowledge when generating the context data for a new object. For example, it is possible to appropriate a part of the context data for objects common to each other or generate the context data for a plurality of variation products by continuing the context data for a basic product and adding an attribute to the data. Moreover, it is possible to use context data for a component of another context data. Thus, it is easily to secondarily use context data because the context data holds various attributes by structurizing them together with their semantics.

After the context data is generated, the teaching data generation section 23 generates the teaching data for recognition processing (step S5). Specifically, the above operation is performed as described below.

Firstly, a recognition logic to be used for recognition processing is decided. It is allowed to make a use decide the recognition logic. In this case, it is preferable that the teaching data generation section 23 collates attributes included in context data with types of characteristic values used for recognition logics and selects a usable or optimum recognition logic as a prospective logic. In the case of the example in FIG. 4, four recognition logics usable by the teaching data generation section 23 are selected (A to D) and a user selects the recognition logic B out of the logics A to D.

Then, by referring to the type of a characteristic value used for a recognition logic, an attribute corresponding to the type is extracted from the context data entered in the knowledge base 21. For example, when the recognition logic B uses two characteristic values of brightness and area, the teaching data generation section 23 extracts the brightness, area, and attributes for fluctuations of the brightness and area (individual-difference value region and environmental-difference value region). In this case, it is assumed that brightness "10", area "9 cm$^2$", fluctuation of brightness "±0.2", and fluctuation of area "±0.003 cm$^2$" are extracted.

Then, teaching data for the recognition processing is generated by properly processing the extracted attributes in accordance with the content of the recognition logic B. For example, when the recognition logic B uses the upper limit value of brightness and the lower limit value of area as thresholds, the upper limit value "10.2" of the brightness and the lower limit value "8.997 cm$^2$" of the area are calculated in accordance with the above attributes. Moreover, because an area is handled in the number of pixels in actual recognition processing, the lower limit value "8.997 cm$^2$" of area is converted into the number of pixels "7440" in accordance with an image resolution. Teaching data is generated from a threshold thus calculated. The value of the "range" included in the teaching data in FIG. 4 is a range showing the position of an IC chip in an image and is set by a user.

In step S6, a test inspection is performed which shows whether recognition processing is correctly performed in accordance with the generated teaching data (as intended by a user). For example, several non-defective and defective samples of IC chips are prepared and recognition processing is applied to the samples to confirm the determination results.

When the recognition processing is correctly performed, the teaching data is stored in the teaching data storage section 14 to complete the teaching processing. However, when the recognition processing fails, step S3 is restarted to enter more detailed knowledge in the knowledge base and then repeat generation of context data and teaching data again (step S7).

According to the teaching processing of this embodiment described above, it is possible to easily generate accurate teaching data from one to several teacher images and reduce the time and labor necessary for teaching.

After the above teaching stage is completed, the image recognition apparatus starts the image recognition stage (product inspection of IC chip). In the case of the product inspection, the image of a work (inspection object) is captured by the imaging section 10, a characteristic value is extracted from the image of the work by the image processing section 12 through image processing and recognition processing is executed by the recognition processing section 13 in accordance with the teaching data read from the teaching data storage section 14 and the extracted characteristic value to determine whether the work is an object. When it is determined that the work is an object, a determination result showing objects other than the work are defective is output. According to this embodiment, it is possible to accurately perform recognition processing by using the accurate teaching data generated through the above teaching processing.

Second Embodiment

As described above, in the case of context data, various attributes of objects are described together with their semantics. Therefore, the information on the context data is superior in versatility and appropriateness and it is easy to use the context data for various-purposes and problem solution. In the case of the first embodiment, context data is used to generate teaching data. In the case of the second embodiment, however, context data is also used for recognition processing.

Figure 6:
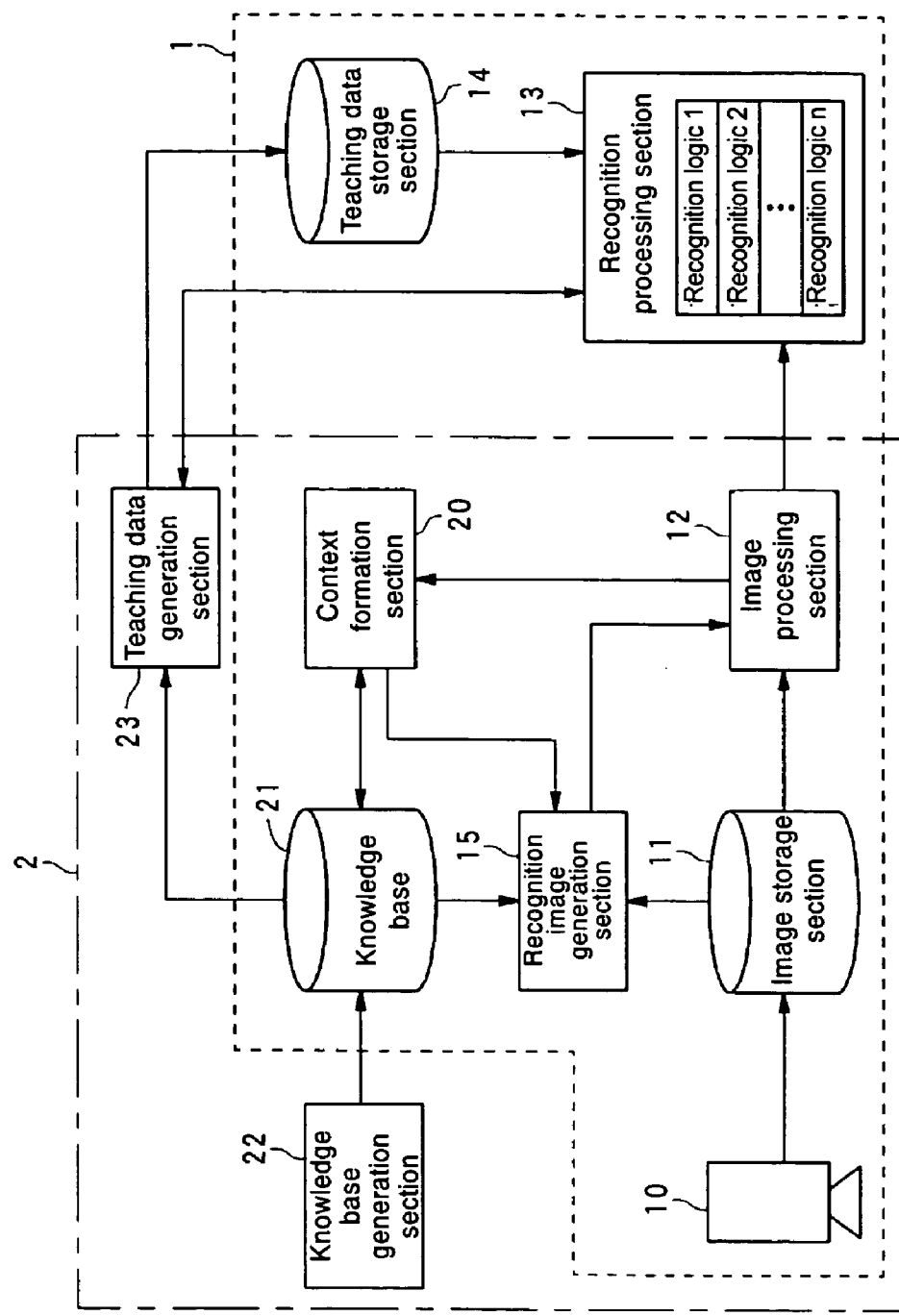
FIG. 6 shows a block diagram showing a functional configuration of an image recognition apparatus of a second embodiment of the present invention.

FIG. 6 shows a block diagram showing a functional configuration of the image recognition apparatus of the second embodiment of the present invention. The image recognition apparatus of the second embodiment is different in structure from that of the first embodiment in that a recognition image generation section 15 is included. A configuration and action specific to this embodiment are mainly described below and a section common to that of the first embodiment is provided with the same symbol and its detailed description is omitted.

Figure 7:
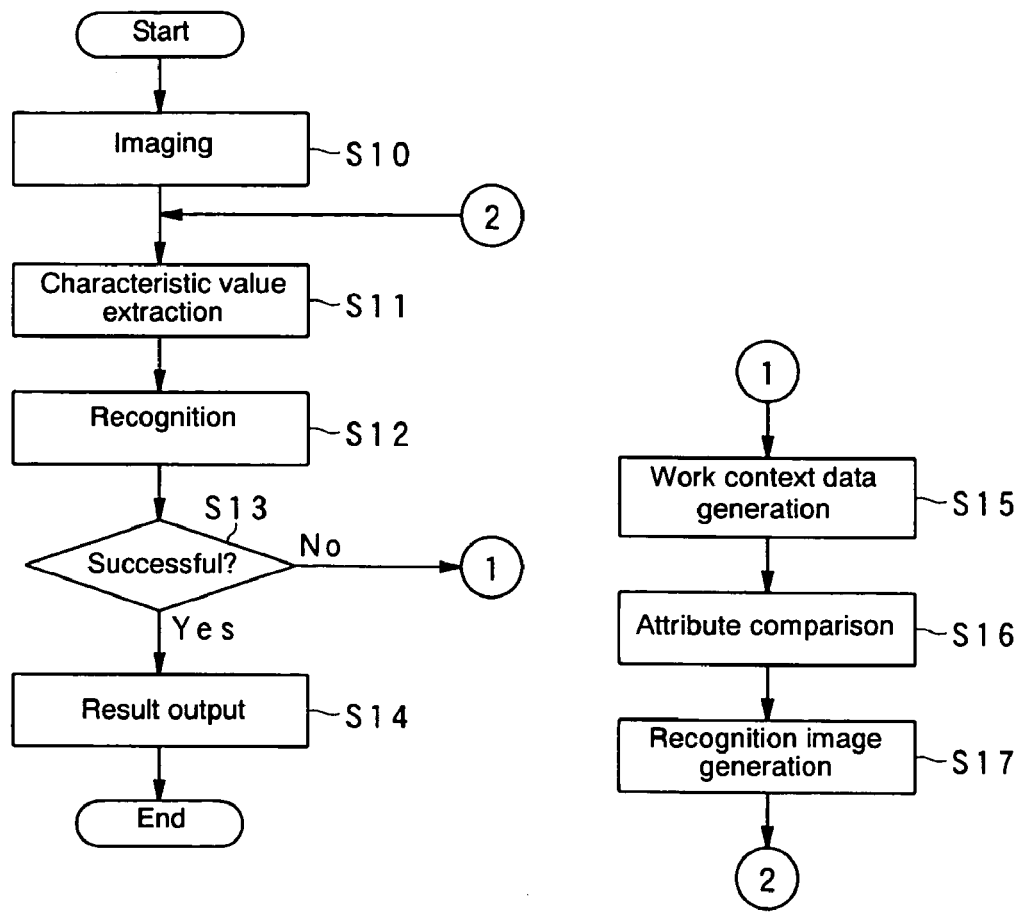
FIG. 7 shows a flowchart showing a flow of recognition processing.

FIG. 7 shows a flowchart showing a flow of recognition processing. A flow of the processing for performing a non-defective product inspection of IC chips is described by referring to FIG. 7 and using the teaching data generated in the first embodiment.

Firstly, a work is imaged by the imaging section 10 to capture the image of the work (step S10). The image processing section 12 extracts various characteristic values such as the transparency, texture, color, brightness, length, and area of the surface of an IC chip by applying image processing to the captured image of the work (step S11). Moreover, it is allowed to extract the characteristic value of the background portion around the IC chip.

The recognition processing section 13 reads teaching data from the teaching data storage section 14. Then, recognition processing is executed in accordance with the teaching data and the characteristic values extracted by the image processing section 12 (step S12).

In this case, brightness and area are selected out of the characteristic values in accordance with the content of the recognition processing defined by the teaching data and these values are delivered to the recognition logic B. It is examined by the recognition logic B whether the brightness of the work is equal to or less than the threshold "10.2" and the area (number of pixels) of the work is equal to or more than "7440". When the both conditions are satisfied, a non-defective IC chip is determined. When at least either condition is not satisfied, a defective IC chip is determined. When a determination result is obtained, recognition is successful. In this case, the determination result is output to a display and recognition processing is completed (steps S13 and S14).

When characteristic values (brightness and area) necessary for recognition processing cannot be extracted by the image processing section 12, the characteristic values are greatly deviated from commonsense values even if extracted, or recognition processing is not normally executed, no determination result is obtained and recognition fails. In this case, the recognition image generation processing in steps S15 to S17 is started (step S13).

In the case of the recognition image generation processing, the context formation section 20 first receives characteristic values extracted from the image of the work and generates work context data for defining various attributes of the work from the characteristic values (step S15). The work context data is data having the same format as context data, in which the attribute of the work is described together with its semantics. The generated work context data is delivered to the recognition image generation section 15.

The recognition image generation section 15 reads the context data for objects entered in the knowledge base 21 and compares each attribute of the work context data with a corresponding attribute of the context data to examine the difference between attributes (step S16). Because standard states of various attributes of objects are defined in the context data, it is possible to find a problem on the original image of the work, that is, a cause failing in recognition processing by examining differences from the standard states.

Then, the recognition image generation section 15 receives the original image of the work from the image storage section 11, applies a proper image processing to the image of the work in accordance with the difference between detected attributes, and generates a recognition image (step S17).

For example, when the value of an area or length is greatly different, it is estimated that edge extraction or region extraction is not normally performed in the image processing section 12 and image processing such as sharpness or edge reinforcement is applied to solve the problem. Or, when the color tone or density of the whole image is deviated from the standard state, image processing such as color tone correction, density correction, or contrast correction is applied to correct the deviation. Moreover, a proper image processing such as noise elimination or resolution conversion is applied in accordance with the type of an attribute or the content of difference.

The recognition image obtained as described above is an image from which the problem on the original image of the work is removed. Therefore, by using the recognition image and thereby performing recognition processing again (steps S11 and S12), the probability that recognition is successful becomes higher. Moreover, because the recognition image has an S/N ratio higher than that of the original image, the recognition accuracy is also improved.

According to the image recognition apparatus of this embodiment described above, even if failing in recognition in the case of the original image obtained through imaging, a recognition image in which the problem on the original image is corrected is automatically generated and recognition processing is executed again by using the recognition image. Therefore, the success rate and accuracy of recognition processing are improved.

Third Embodiment

In the case of a third embodiment of the present invention, context data is used to update teaching data.

The image recognition apparatus of this embodiment has the same configuration as the first or second embodiment, illustration is omitted and description is made by using the same symbols.

Figure 8:
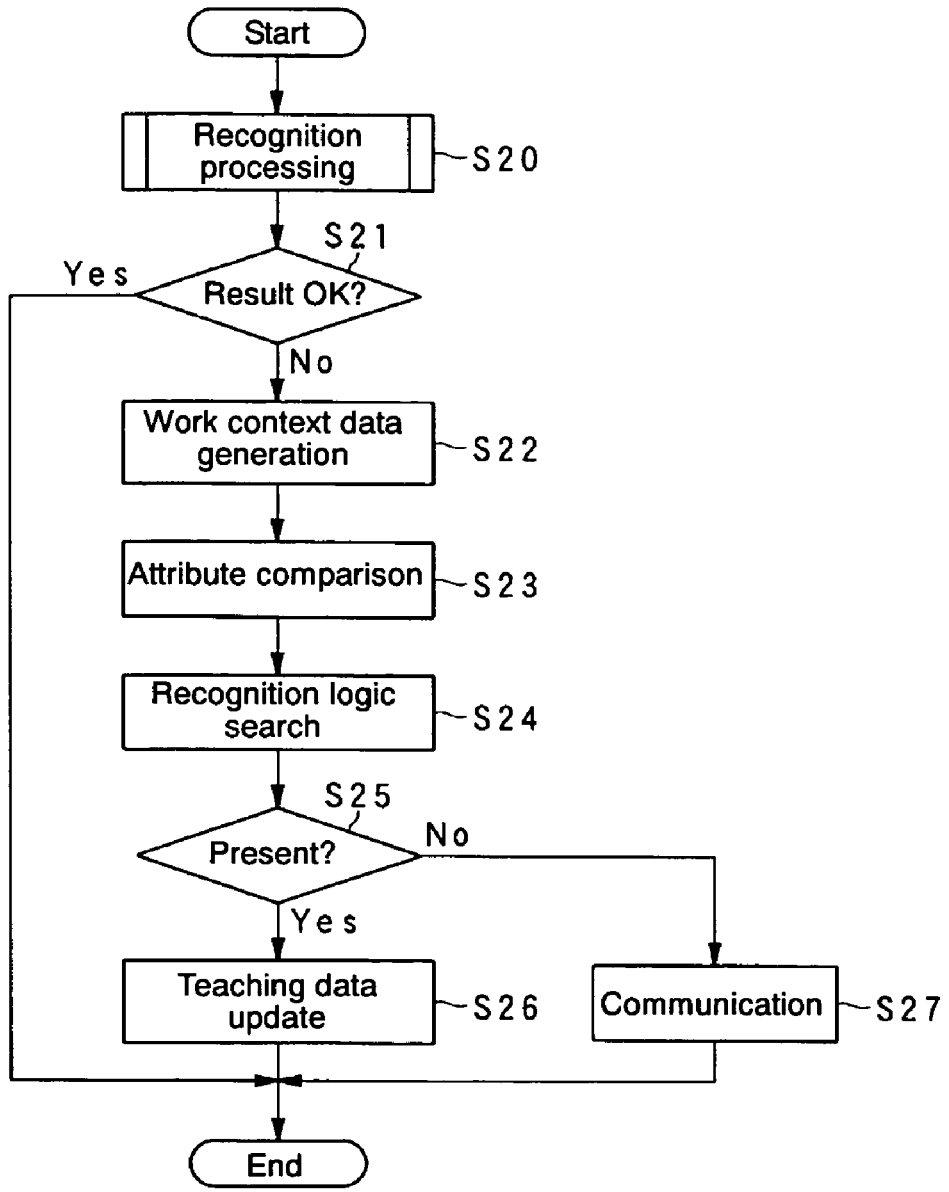
FIG. 8 shows a flowchart showing a flow of teaching data update processing.

FIG. 8 shows a flowchart sowing a flow of teaching data update processing. Contents of the recognition processing in step S20 in the flowchart are the same as those in steps S10 to S17 of the flowchart in FIG. 7.

When recognition processing is successful, the determination result is output to a display (step S20). In this case, a user can input whether the determination result is correct (indented result).

That the determination result is not correct represents that the teaching data is not proper. Therefore, when that the determination result is incorrect is input by the user (step S21), the teaching data update processing described below is executed.

Firstly, the context formation section 20 receives characteristic values extracted from the work image and generates work context data from the characteristic values (step S22). The generated work context data is delivered to the teaching data generation section 23.

The teaching data generation section 23 reads the context data for objects entered in the knowledge base 21 and compares each attribute of the work context data with a corresponding attribute in the context data to examine the difference between attributes (step S23). Moreover, the section 23 selects one or more attributes capable of correctly determining a work based on the difference between attributes (for example, attribute in which a difference remarkably appears or attribute in which a difference hardly appears).

Then, the teaching data generation section 23 searches a recognition logic capable of executing recognition processing or a combination of recognition logics by using characteristic values corresponding to attributes selected in step S23 out of a plurality of recognition logics usable for recognition processing (step S24).

When a corresponding recognition logic is searched (step S25), the teaching data is updated (step S26). In this case, it is allowed to add the content for the recognition logic searched this time to the existing teaching data or replace the existing teaching data with the data this time.

However, when no corresponding recognition logic is searched, the content is communicated to a user (step S27). In this case, it is recommended to display a message for communicating the specification of a recognition logic to be added such as a message saying, "add recognition logic for performing recognition processing in accordance with characteristic values X, Y, and Z" on a display. When the user develops and adds a new recognition logic in accordance with the communicated specification, it is possible to perform accurate recognition processing.

According to the image recognition apparatus of this embodiment described above, when a correct determination result is not obtained, new teaching data according to a proper recognition logic is automatically generated. Therefore, manual homestretch of teaching data is unnecessary, the time and labor necessary for teaching are reduced, and the success rate and accuracy of recognition processing are also improved.

Moreover, when a proper recognition logic is not present, the specification of a recognition logic to be added is communicated. Therefore, it is possible to find a recognition logic to be newly added. This is very effective when handling a new object which cannot be recognized by an existing recognition logic.

The first to third embodiments are only specific examples of the present invention. The range of the present invention is not restricted to the above embodiments. Various modifications are allowed in the range of the technical thought of the present invention.

For example, in the case of the above embodiments, the present invention is applied to an inspection apparatus for inspecting industrial products. However, it is possible to preferably apply the present invention to various image recognition apparatuses including the visual sense apparatus of a robot other than the inspection apparatus.

Moreover, types of a characteristic value and attribute used for teaching processing and image recognition processing and formats of context data and teaching data are not restricted to those described for the above embodiments. It is possible to properly change them in accordance with an object to be recognized or a configuration of an image recognition apparatus.

As described above, according to the present invention, it is possible to easily generate accurate teaching data from a small number of teacher images. Moreover, according to the present invention, it is possible to improve the success rate and accuracy of recognition processing.

What is claimed is:

1. A teaching method of an image recognition apparatus, comprising:

a step of capturing an image of a standard object having a standard conformation among objects to be recognized and extracting a characteristic value from a teacher image of the standard object through image processing;

a step of making a user input an already-known knowledge of a range of fluctuation of objects and other objects and entering the knowledge in a knowledge base;

a step of generating context data in which various attributes associated with the objects are described together with their semantics in accordance with the characteristic value extracted from the teacher image of the standard object and the knowledge entered in the knowledge base and updating the context data in the knowledge base based on comparison between the presently generated context data and the context data stored in the knowledge base; and a step of extracting an attribute corresponding to the type of a characteristic value used for recognition processing from the context data entered in the knowledge base and generating teaching data based on the extracted attribute for the recognition processing, wherein the teaching data include, at least, parameters related to a recognition logic, a threshold value, and a region recognized as the object applied to the recognition process; and wherein the already-known knowledge includes a parameter related to tolerance.

2. The teaching method of the image recognition apparatus according to claim 1, wherein a range of fluctuation due to the individual difference between objects and a range of fluctuation due to the environmental difference at the time of photographing are made to input as the knowledge of a range of fluctuation of objects.

3. The teaching method of the image recognition apparatus according to claim 2, wherein a tolerance for design is made to input as the knowledge of a range of fluctuation due to the individual difference between objects.

4. The teaching method of the image recognition apparatus according to claim 1, wherein an attribute for a standard object is made to input as knowledge.

5. The teaching method of the image recognition apparatus according to claim 1, wherein in the case of context data, various attributes are described by a structurization language.

6. A teaching apparatus of an image recognition apparatus, the teaching apparatus for performing functions comprising:

capturing an image of a standard object having a standard conformation among objects to be recognized and extracting a characteristic value from a teacher image of the standard object through image processing, making a user input an already-known knowledge of a range of fluctuation of objects and other objects and entering the knowledge in a knowledge base, generating the context data in which various attributes associated with the objects are described together with their semantics in accordance with a characteristic value extracted from the teacher image of the standard object and the knowledge entered in the knowledge base and updating the context data in the knowledge base based on comparison between the presently generated context data and the context data stored in the knowledge base, and extracting an attribute corresponding to the type of a characteristic value used for recognition processing from the context data entered in the knowledge base and generating the teaching data based on the extracted attribute for the recognition processing, wherein the teaching data include, at least parameters related to a recognition logic, a threshold value, and a region recognized as the object applied to the recognition process; and wherein the already-known knowledge includes a parameter related to tolerance.

7. The teaching apparatus of the image recognition apparatus according to claim 6, wherein a range of fluctuation due to the individual difference between objects and a range of fluctuation due to the environmental difference at the time of photographing area made to input as the knowledge of a range of fluctuation of objects.

8. The teaching apparatus of the image recognition apparatus according to claim 7, wherein a tolerance for design is made to input as the knowledge of a range of fluctuation due to the individual difference between objects.

9. The teaching apparatus of the image recognition apparatus according to claim 6, wherein an attribute for a standard object is made to input as knowledge.

10. The teaching apparatus of the image recognition apparatus according to claim 6, wherein in the case of context data, various attributes are described by a structunzation language.

11. A computer readable medium encoded with a computer program of an image recognition apparatus for making a computer execute processing functions comprising:

processing for capturing an image of a standard object having a standard conformation among objects to be recognized and extracting a characteristic value from a teacher image of the standard object through image processing;

processing for making a user input an already-known knowledge of a range of fluctuation of objects and other objects and entering the knowledge in a knowledge base;

processing for generating the context data in which various attributes associated with the objects are described together with their semantics in accordance with a characteristic value extracted from the teacher image of the standard object and the knowledge entered in the knowledge base and updating the context data in the knowledge base based on comparison between the presently generated context data and the context data stored in the knowledge base; and processing for extracting an attribute corresponding to the type of a characteristic value used for recognition processing for the context data entered in the knowledge base and generating the teaching data based on the extracted attribute for the recognition processing;

wherein the teaching data include, at least, parameters related to a recognition logic, a threshold value, and a region recognized as the object applied to the recognition process; and wherein the already-known knowledge includes a parameter related to tolerance.

12. An image recognition method comprising:

a step of capturing an image of a standard object having a standard conformation among object to be recognized and extracting a characteristic value from a teacher image of the standard object through image processing;

a step of making a user input an already-known knowledge of a range of fluctuation of objects and other objects and entering the knowledge in a knowledge base;

a step of generating the context data in which various attributes associated with the objects are described together with their semantics in accordance with a characteristic value extracted from the teacher image of the standard object and the knowledge entered in the knowledge edge base and updating the context data in the knowledge base based on comparison between the presently generated context data and the context data stored in the knowledge base;

a step of extracting an attribute corresponding to the type of a characteristic value used for recognition processing from the context data entered in the knowledge base and generating the teaching data based on the extracted attribute for the recognition processing;

a teaching stage for storing the generated teaching data in a teaching data storage device;

a step of capturing the image of a work and extracting a characteristic value from the image of the work through image processing; and an image recognition stage for executing recognition processing in accordance with the teaching data read from the teaching data storage device and the extracted characteristic value and determining whether the work is an object;

wherein the teaching data include, at least, parameters related to a recognition logic, a threshold value, and a region recognized as the object applied to the recognition process; and wherein the already-known knowledge includes a parameter related to tolerance.

13. The image recognition method according to claim 12, wherein when failing in recognition at an image recognition stage, work context data for defining various attributes of the work is generated from the characteristic value of the extracted work, image processing is applied to the image of the work in accordance with the difference between attributes of the generated context data and the context data for an object entered in a knowledge base, and recognition processing is executed in accordance with an image-processed work image.

14. The image recognition method according to claim 12, wherein when a correct determination result is not obtained at an image recognition stage, work context data for defining various attributes of an extracted work is generated from the characteristic value of the work, an attribute capable of correctly determining a work is selected in accordance with the difference between attributes of the generated work context data and the context data for an object entered in a knowledge base, a recognition logic capable of executing recognition processing is searched by using a characteristic value corresponding to the selected attribute from a plurality of recognition logics usable for recognition processing, and teaching data for the searched recognition logic is generated.

15. The image recognition method according to claim 14, wherein when a recognition logic capable of executing recognition processing by using a characteristic value corresponding to a selected attribute is not searched, the content is communicated to a user.

16. The image recognition method according to claim 15, wherein when a recognition logic capable of executing recognition processing by using a characteristic value corresponding to a selected attribute is not searched, the specification of a recognition logic to be added is communicated in accordance with the selected attribute.

17. An image recognition apparatus comprising:

a teaching apparatus for performing functions comprising capturing an image of a standard object having a standard conformation among objects to be recognized and extracting a characteristic value from a teacher image of the standard object through image processing, making a user enter an already-known knowledge of a range of fluctuation of objects and other objects and entering the knowledge in a knowledge base, generating context data in which various attributes associated with the objects are described together with their semantics in accordance with a characteristic value extracted from the teacher image of the standard object and the knowledge entered in the knowledge base and upgrading the context data in the knowledge base based on comparison between the presently generated context data and the context data stored in the knowledge base, extracting an attribute corresponding to the type of a characteristic value used for recognition processing from the context data entered in the knowledge base and generating the teaching data based on the extracted attribute for the recognition processing, and storing the generated teaching data in a teaching data storage device; and an image recognition device for performing functions comprising capturing the image of a work and extracting a characteristic value from the image of the work through image processing, executing recognition processing in accordance with the teaching data read from the teaching data storage device and the extracted characteristic value, and determining whether the work is an object, wherein the teaching data include, at least, parameters related to a recognition logic, a threshold value, and a region recognized as the object applied to the recognition process; and wherein the already-known knowledge includes a parameter related to tolerance.

18. The image recognition apparatus according to claim 17, wherein an image recognition device generates the work context data for defining various attributes of an extracted work in accordance with the characteristic value of the work, applies image processing to the image of the work in accordance with the difference between attributes of the generated context data and the context data for an object entered in a knowledge base, and executes recognition processing in accordance with an image-processed work image.

19. The image recognition apparatus according to claim 17, wherein an image recognition device has a plurality of recognition logics usable for recognition processing, generates the work context data for defining various attributes of an extracted work from the characteristic value of the work, selects an attribute capable of correctly determining the work in accordance with the difference between attributes of the generated work context data and the context data of an object entered in a knowledge base, searching a recognition logic capable of executing recognition processing by using a characteristic value corresponding to the selected attribute, and makes a teaching device generate the teaching data for the searched recognition logic.

20. The image recognition apparatus according to claim 19, wherein when a recognition logic capable of executing recognition processing by using a characteristic value corresponding to a selected attribute is not searched, an image recognition device communicates the content to a user.

21. The image recognition apparatus according to claim 20, wherein when a recognition logic capable of executing recognition processing by using a characteristic value corresponding to a selected attribute is not searched, an image recognition device communicates the specification of a recognition logic to be added in accordance with the selected attribute.

22. A computer readable medium encoded with a computer program for making a computer execute processing functions comprising:

teaching processing comprising capturing an image of a standard object having a standard conformation among objects to be recognized and extracting a characteristic value from a teacher image of the standard object though image processing, making a user input already-known knowledge of a range of fluctuation of objects and other objects and entering the knowledge in a knowledge base, generating context data in which various attributes associated with the objects are described together with their semantics in accordance with the characteristic value extracted from the teacher image of the standard object and the knowledge entered in the knowledge base, updating the context data in the knowledge base based on comparison between the presently generated context data and the context data stored in the knowledge base, extracting an attribute corresponding to the type of a characteristic value used for recognition processing from the context data entered in the knowledge base and generating the teaching data based on the extracted attribute for the recognition processing, and storing the generated teaching data in a teaching data storage device, and image recognition processing comprising capturing the image of a work and extracting a characteristic value from the image of the work, executing recognition processing in accordance with the teaching data read from the teaching data storage device and the extracted characteristic value and determining whether the work is an object, wherein the teaching data include, at least, parameters related to a recognition logic, a threshold value, and a region recognized as the object applied to the recognition process; and wherein the already-known knowledge includes a parameter related to tolerance.

23. The teaching method of the image recognition apparatus according to claim 2, wherein an attribute for a standard object is made to input as knowledge.

24. The teaching method of the image recognition apparatus according to claim 3, wherein an attribute for a standard object is made to input as knowledge.

25. The teaching method of the image recognition apparatus according to claim 2, wherein in the case of context data, various attributes are described by a structurization language.

26. The teaching method of the image recognition apparatus according to claim 3, wherein in the case of context data, various attributes are described by a structurization language.

27. The teaching method of the image recognition apparatus according to claim 4, wherein in the case of context data, various attributes are described by a structurization language.

28. The teaching apparatus of the image recognition apparatus according to claim 7, wherein an attribute for a standard object is made to input as knowledge.

29. The teaching apparatus of the image recognition apparatus according to claim 8, wherein an attribute for a standard object is made to input as knowledge.

30. The teaching apparatus of the image recognition apparatus according to claim 7, wherein in the case of context data, various attributes are described by a structurization language.

31. The teaching apparatus of the image recognition apparatus according to claim 8, wherein in the case of context data, various attributes are described by a structurization language.

32. The teaching apparatus of the image recognition apparatus according to claim 9, wherein in the case of context data, various attributes are described by a structurization language.

33. The image recognition method according to claim 13, wherein when a correct determination result is not obtained at an image recognition stage, work context data for defining various attributes of an extracted work is generated from the characteristic value of the work, an attribute capable of correctly determining a work is selected in accordance with the difference between attributes of the generated work context data and the context data for an object entered in a knowledge base, a recognition logic capable of executing recognition processing is searched by using a characteristic value corresponding to the selected attribute from a plurality of recognition logics usable for recognition processing, and teaching data for the searched recognition logic is generated.

34. The image recognition apparatus according to claim 18, wherein an image recognition device has a plurality of recognition logics usable for recognition processing, generates the work context data for defining various attributes of an extracted work from the characteristic value of the work, selects an attribute capable of correctly determining the work in accordance with the difference between attributes of the generated work context data and the context data of an object entered in a knowledge base, searching a recognition logic capable of executing recognition processing by using a characteristic value corresponding to the selected attribute, and makes a teaching device generate the teaching data for the searched recognition logic.

* * * * *

UNITED STATES PATENT AND TRADEMARK OFFICE
CERTIFICATE OF CORRECTION

PATENT NO. : 7,634,131 B2 Page 1 of 1
APPLICATION NO. : 10/861896
DATED : December 15, 2009
INVENTOR(S) : Akira Nakajima et al.

It is certified that error appears in the above-identified patent and that said Letters Patent is hereby corrected as shown below:

In the Claims:

In Claim 6, Column 14 (line 1), ", at least" should read --, at least$_2$--;

In Claim 10, Column 14 (line 22), "structunzation" should read --structu*r*ization--;

In Claim 22, Column 17 (line 15), "though" should read --th*r*ough--.

Signed and Sealed this

Twenty-third Day of February, 2010

David J. Kappos
*Director of the United States Patent and Trademark Office*